May 3, 1932. J. BOERY 1,856,534
ADJUSTABLE SEAT BACK
Filed July 11, 1928   3 Sheets-Sheet 1

Inventor:
Jean Boery
by
S. Sokal, attorney

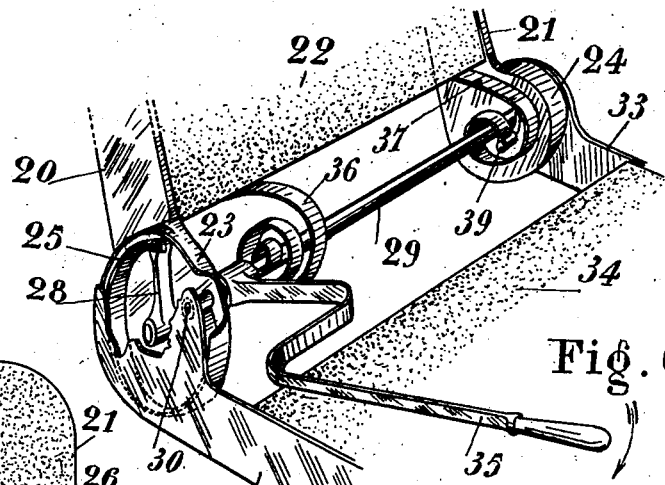
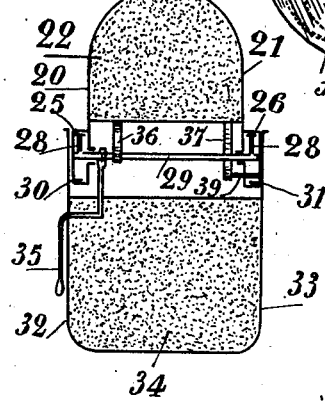
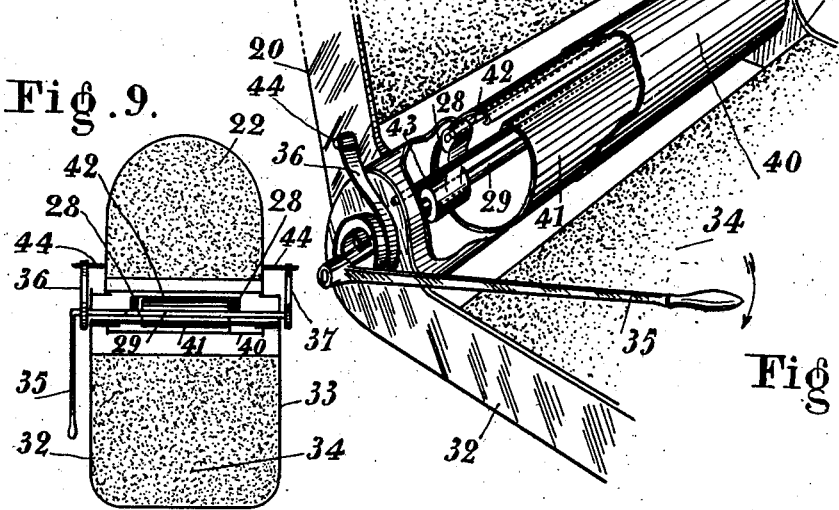

May 3, 1932.  J. BOERY  1,856,534
ADJUSTABLE SEAT BACK
Filed July 11, 1928    3 Sheets-Sheet 3

Inventor
Jean Boery
by
S. Sorral, Attorney

Patented May 3, 1932

1,856,534

UNITED STATES PATENT OFFICE

JEAN BOERY, OF PARIS, FRANCE

ADJUSTABLE SEAT-BACK

Application filed July 11, 1928, Serial No. 291,834, and in France July 20, 1927.

The present invention relates to chairs and other articles of furniture for sitting and reclining upon, and, in particular to such articles of furniture provided with backs having an adjustment device which renders it possible for the person seated to adjust the said back to any desired inclined position and to fix it therein by suitable fixing means such as brake members.

The invention consists in an article of furniture of this kind comprising a seat; a spindle secured at the rear thereto; a tube mounted on said spindle; a crank detachably engaged with said tube; an inclinable back pivotally supported at its lower end on said spindle; a friction brake member fixed to said back; a movable friction brake member fixed to said seat co-operating with said first-named brake member; a spring member attached at one end to said tube and at the other end to said back, and means on said crank and operating to shift said tube whereby said brake members are brought in and out of contact and said back is clamped or unclamped to said seat upon operation of said crank, and the braking effect of the brake members is obtained in proportion to the force exerted rearwardly on the back, said spring member tending to urge said back into a vertical position and said movable friction brake member into contact with the other friction brake member.

The device according to the invention preferably comprises friction brake members consisting of discs or sectors fixed to the back and interpolated between other similar discs or sectors fixed to the seat, which interpolated discs or sectors are pressed up against one another so as to exert a braking effect by means of a cam disc operated by friction on a cam disc or like member fixed to the back, the braking effect being caused to cease when said cam disc is operated in the reverse direction, the movement for causing the braking effect to cease being controlled by a lever which is operated either directly or through the medium of a flexible transmission or the like. The back is then returned to its vertical position by means of a spring or moved to the rear again by pressure exerted by the back of the seated person.

The utilization of friction brake members or discs for maintaining the back in any desired inclined position has the object of eliminating the racks or notches in present use, which are employed to fix the back in certain definite variable inclined positions and of replacing the transmission devices which have hitherto been employed to connect the back to braking apparatus of known type.

Some preferred embodiments of the object of the present invention are illustrated by way of example in the accompanying drawings, in which.

In order to facilitate the reading of these two figures the manipulating handle is indicated in dotted lines.

Figure 4:
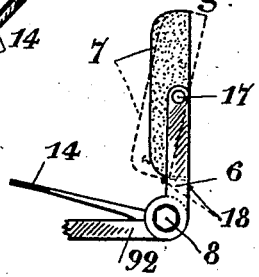

Fig. 4 is a side view of a part of a mounting supporting a back which is mounted on journals.

Figure 5:
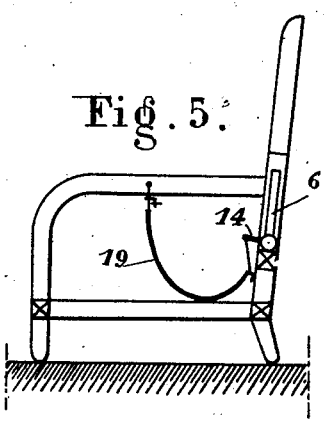

Fig. 5 shows the application to an arm chair, of the device as adapted to be actuated by a push button connected to a flexible transmission device.

Fig. 6 represents a perspective view of a further example with parts in section.

Fig. 7 shows diagrammatically the example illustrated in Fig. 6.

Fig. 8 is a perspective view of a modification of the example shown in Fig. 6 with parts in section.

Fig. 9 shows diagrammatically the modification illustrated in Fig. 8.

Figure 10:
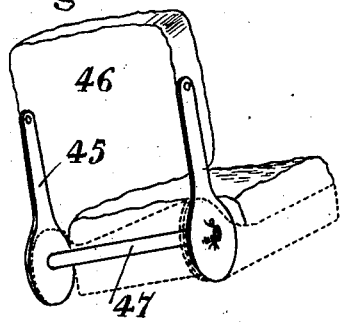

Fig. 10 is a perspective view of another embodiment of the object of the present invention.

Figure 11:
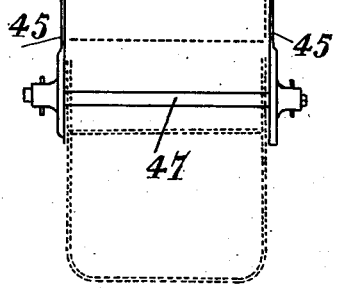

Fig. 11 shows diagrammatically the embodiment of Fig. 10.

Figure 12:
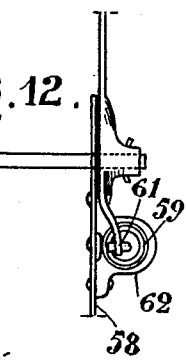

Fig. 12 is a plan view of a detail of a modified form, and

Figure 13:
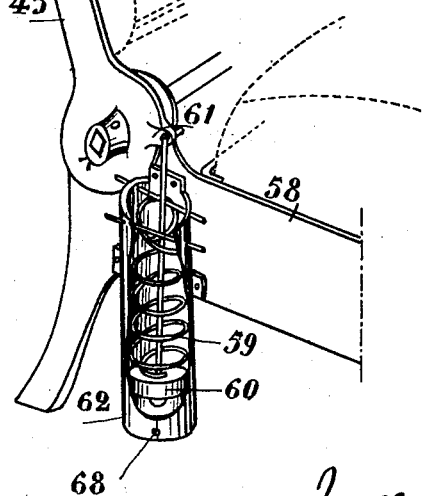

Fig. 13 is a perspective view of the detail shown in Fig. 14, with parts broken away.

Figure 1:
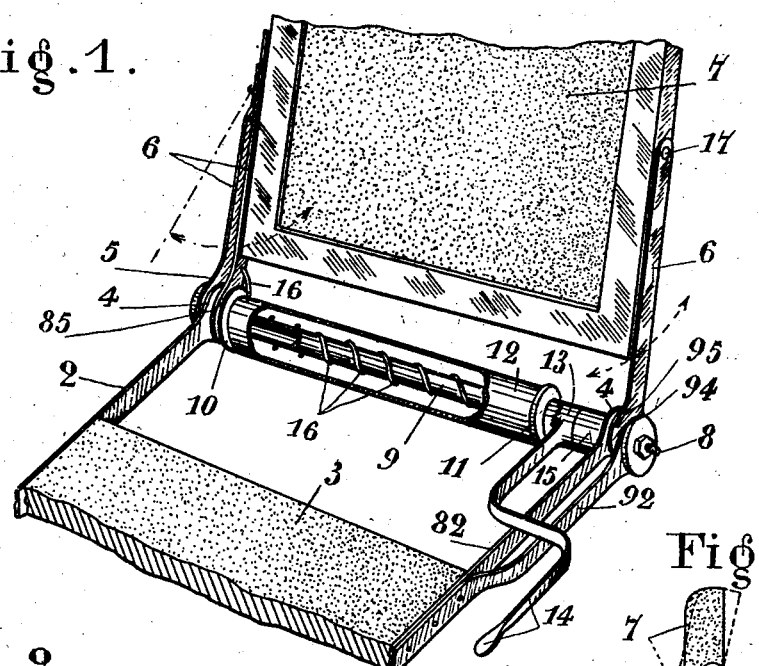
Fig. 1 is a perspective view with some parts shown in section, of a first embodiment.

Referring to the drawings (Figs. 1, 2 and 3) the device is provided with a seat 3 having iron mountings or bars 2, 82, 92 fixed to its sides. The said mountings are provided at their ends with friction brake members or discs 4, 4, 94, which are interpolated with other friction members or discs 5, 85, 95 provided at the ends of iron mountings or bars 6 fixed on the sides of the inclinable back 7 of the seat. The said friction brake members or discs have a spindle 8 passing through them, which serves as a pivot for the back 7. On this spindle a tube 9 is arranged which is provided at its ends with plates 10 and 11, the said tube being enclosed within another tube 12 forming a casing. The plate 11 is provided with a toothed gear of known kind co-operating with a similar toothed gear formed on a crank having a cam disc 13 and a manipulating handle 14. The cam disc 13 co-operates with a cam disc 15 fixed to the iron mounting 82 in such manner that when the said cam disc 13 is turned in the one direction the plate 10 and the cam disc 15 are moved farther away from one another whereby on the one side of the device the friction brake member 4 is forced against the friction brake member 95 and the latter is forced against the member 94 whilst on the other side of the device the member 85 is forced against the member 4 and this latter is forced against the member 5, the seat and back thus being clamped together. When the cam disc 13 is turned in the opposite direction the reverse action takes place and the seat and back are unclamped from one another.

A spring 16 fixed at the one end to the plate 11 and at the other end to the iron mounting 85 tends to pull the back 7 into its vertical position.

The iron mountings 6 may be provided with a journal 17 rendering it possible further to incline the back 7 in order to allow it to adapt itself exactly to the back of the seated person.

In order to increase the frictional resistance of the discs, they may be conical and other discs (not shown on the drawings) of frictional or plastic material may, if desired, also be provided.

Figure 2:
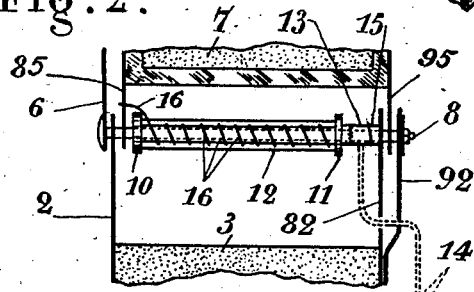
Fig. 2 shows to a smaller scale than that of Figure 1 the position of separation of the friction discs rendering it possible to obtain any desired inclination of the back.

The operation of the apparatus is as follows:

Assuming that the manipulating handle is in the raised position (Fig. 3) and the seat and back are thus clamped together, if it be desired to lower the back 7, it is only necessary for the person seated to depress the handle 14 into the position shown in Fig. 2, whereby the friction brake members will be brought out of contact with one another as above described and the back will be free to move with regard to the seat. The back 7 can then be caused to assume any desired inclined position by the mere pressure of the back of the person seated. During the movement of the back 7 to the rear the spring 16 is tensioned. If the handle 14 is then released the tension of the spring 16 causes the plate 11 and thereby also the member 13 which is in engagement therewith through the medium of the toothed gear to turn into the position shown in Fig. 3, thus causing the back 7 and the seat 3 to be clamped together again. The aforesaid toothed gear serves for the preliminary adjustment of the spring 16.

Figure 3:
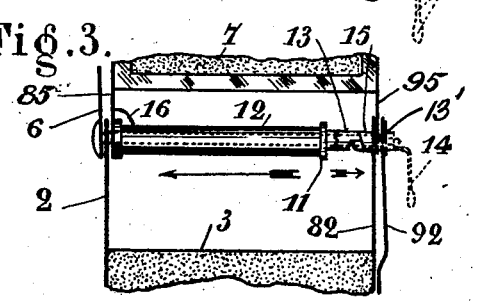
Fig. 3 shows to a smaller scale the position of proximity or contact of the said discs, in which position they operate by friction on one another so as to cause the back to be fixed in position.

It may be mentioned that, when the parts of the device are in the position shown in Fig. 3, any pressure exercised on the back 7 by the person seated will have the effect of increasing the friction between the friction brake members inasmuch as the cam disc 13 moved by the friction of the plate 10 on the iron mounting 86 has the tendency to engage with its co-operating cam disc.

When it is desired to raise the back again, this is effected by again lowering the handle 14, thus causing the cam disc 13 to move into the position shown in Fig. 2 so that the braking action of the friction discs ceases.

The tension of the spring 16 automatically draws back the back 7 towards its initial position.

The back may also be re-adjusted to its vertical position or be lowered onto the seat respectively by means of a simple push of the back of the seat. Under the action of the push, the plate 10, moved by the friction on the mounting 85, disengages the cam disc 13 which causes the braking action to cease and enables the required movement to take place.

In order to render it possible to lower the back 7 completely onto the seat 3, it is only necessary to provide a flat part 13' (see Fig. 3) on the cam disc 13 and on its co-operating cam disc 15 so as to have the effect of annulling the braking action between the forward horizontal position of the back 7 and the vertical position of the said back.

The device according to the invention may be operated by means of a flexible cable or control device 19 of known operation, the application of which is shown on Fig. 5.

In the embodiment shown in Figs. 6 and 7 a band-brake and a spiral spring for returning the back to its initial position are provided. For this purpose the mountings 20, 21 of the inclinable back 22 are each connected to a brake drum 23, and 24 respectively, enclosing the brake bands 25 and 26 respectively. These bands are fixed at one end to a lever 28 rigidly mounted on the axle 29 and at the other end to the mountings or bars 32, 33 of the seat 34 by means of pins 30, 31. A lever 35 rigidly connected to the axle 29 moves the levers 28 when it is moved downward, thereby freeing the braking devices. The braking devices are likewise released when the back 22 is raised again by hand. The coiling up and tensioning of the springs 36, 37 (which may be replaced by blade springs) is effected by lowering the back 22. The spring 36 is fixed at one end to the back and at its other end to the axle 29. The spring 37 is likewise fixed at one end to the back, but its other end is rigidly connected to a pin 39 fixed at the mounting 33.

In the modified construction shown in Figs. 8 and 9 which operates in similar manner to that above described, the brake drums are replaced by a tube 40 fixed to the mountings 20, 21 of the back 22. Within this tube a large band 41 is movably arranged, said band being fixed at one end to a rod 42 carried by levers 28 rigidly mounted on the oscillating axle 29 actuated by the hand lever 35. At its other end the band 41 is connected to the rod 43 mounted in the mountings 32, 33 of the seat 34. One end of the springs 36, 37 for returning the back 22 to the vertical position is fixed to pins 44 in the mountings 20, 21 of the back 22, their other end being connected to the axle 29.

In Figures 10, 11, the movable mountings 45 of the back 46 instead of being pivotally supported on axle 47 are rigidly connected to each other by means of the oscillating axle 47.

A modified constructional form is shown in Figs. 12 and 13. In this constructional form, if no one is seated on the seat, it is only necessary in order to raise the back to press downwards the handle 48 for releasing the brake. When this is done, the spring 59 shown in Figures 14 and 15 (which was tensioned during the lowering of the back by means of the movement of the piston 60 within the cylinder 62 owing to the piston 60 being connected to the mountings of the back 46 by the lever 61) becomes relaxed. In consequence of this the spring 59 brings the piston 60 back into its initial position, at the same time raising the back 46. The downward motion of the piston 60 is braked by the air contained in the lower part of the cylinder 62, the air only being able to escape through the opening 68.

When the motion is reversed, the piston 60 is retained by the vacuum which is produced in the lower part of the cylinder 62 and which depends on the degree of inclination of the back 46.

I claim:

1. An article of furniture comprising a seat; a spindle secured at the rear thereto; a tube mounted on said spindle; a crank detachably engaged with said tube; a manipulating handle on said crank; an inclinable back pivotally supported at its lower end on said spindle; a friction brake member fixed to said back; a movable friction brake member fixed to said seat co-operating with said first-named brake member; a spring member attached at one end to said tube and at the other end to said back, and means on said crank and operating to shift said tube whereby said brake members are brought in and out of contact and said back is clamped or unclamped to said seat upon operation of said crank, and the braking effect of the brake members is obtained in proportion to the force exerted rearwardly on the back, said spring member tending to urge said back into a vertical position and said movable friction brake member into contact with the other friction brake member.

2. An article of furniture comprising a seat; a spindle secured at the rear thereto; a tube mounted on said spindle; a crank detachably engaged with said tube; a manipulating handle on said crank; an inclinable back pivotally supported at its lower end on said spindle; a friction brake member fixed to said back; a movable friction brake member fixed to said seat co-operating with said first-named brake member; a spring member attached at one end to said tube and at the other end to said back, and means comprising a cam disc on said crank and a co-operating cam disc on said brake member fixed to said seat whereby said brake members are brought in and out of contact and said back is clamped and unclamped to said seat upon operation of said crank, and the braking effect of the brake members is obtained in proportion to the force exerted rearwardly on the back, said spring member tending to urge said back into a vertical position and said movable friction brake member into contact with the other friction brake member.

In testimony whereof I have signed my name to this specification.

JEAN BOERY.